(12) United States Patent
Tarlow

(10) Patent No.: US 8,285,633 B2
(45) Date of Patent: Oct. 9, 2012

(54) SYSTEM AND METHOD FOR DIRECT CLIENT ACCESS FOR MANAGEMENT OF SECURITIES TRANSACTIONS

(76) Inventor: Maier J. Tarlow, Brooklyn, NY (US)

( * ) Notice: Subject to any disclaimer, the term of this patent is extended or adjusted under 35 U.S.C. 154(b) by 149 days.

(21) Appl. No.: 12/904,480

(22) Filed: Oct. 14, 2010

(65) Prior Publication Data

US 2011/0238554 A1    Sep. 29, 2011

Related U.S. Application Data

(60) Provisional application No. 61/318,633, filed on Mar. 29, 2010.

(51) Int. Cl.
*G06Q 40/00* (2012.01)
(52) U.S. Cl. ............................ 705/37; 705/35; 705/36 R
(58) Field of Classification Search ............... 705/35–37
See application file for complete search history.

(56) References Cited

U.S. PATENT DOCUMENTS

| | | | |
|---|---|---|---|
| 5,809,942 A * | 9/1998 | Kralovec et al. | 122/235.14 |
| 7,505,894 B2 * | 3/2009 | Menezes et al. | 704/3 |
| 7,809,632 B2 * | 10/2010 | Chiulli et al. | 705/37 |
| 7,856,396 B2 * | 12/2010 | Chiulli et al. | 705/37 |
| 8,121,935 B2 * | 2/2012 | Chiulli et al. | 705/37 |
| 8,156,036 B1 * | 4/2012 | Waelbroeck et al. | 705/37 |
| 2011/0145124 A1 * | 6/2011 | Rooney | 705/37 |
| 2011/0145165 A1 * | 6/2011 | Haldes et al. | 705/36 R |
| 2012/0109848 A1 * | 5/2012 | Chiulli et al. | 705/36 R |

OTHER PUBLICATIONS

U.S. Appl. No. 12/365,451, filed Feb. 2009, Carrie et al.*

* cited by examiner

*Primary Examiner* — Narayanswamy Subramanian
(74) *Attorney, Agent, or Firm* — Kenyon & Kenyon LLP

(57) ABSTRACT

A computer implemented system and method provides for transmission of a parent shell order of which no portion is placed for execution until a respective child order is obtained. The shell order can be received from a device of an exchange member on behalf of a member's customer and the child orders can be received directly from a device operated by the customer.

14 Claims, 3 Drawing Sheets

SYSTEM AND METHOD FOR DIRECT CLIENT ACCESS FOR MANAGEMENT OF SECURITIES TRANSACTIONS

CROSS-REFERENCE TO RELATED APPLICATIONS

This application claims the benefit, under 35 U.S.C. §119(e), of U.S. Provisional Patent Application No. 61/318,633, filed Mar. 29, 2010, the entire contents of which is hereby incorporated by reference in its entirety.

FIELD OF THE INVENTION

The present invention relates to a system and method that provides for direct client access to a securities order placement device for entry of child orders of a previously placed parent order.

BACKGROUND

Clients often place securities transaction orders with a member of a securities exchange to take advantage of benefits given to such members. Such benefits include a book matching privilege. To obtain a book matching privilege, one must be a member of the securities exchange, e.g., the New York Stock Exchange (NYSE), have a seat on the exchange, be present on the exchange floor, and use floor execution (also referred to as crowd execution). A specialist also may receive such a matching privilege. To place the order via crowd execution, members use assigned hand-held devices registered with the securities exchange.

The matching privilege allows the qualifying member (or specialist) who places a buy order after a prior buy order has already been placed on the securities trading book, to match to a portion of a subsequently placed sell order (conditional upon that at least one order placed by another party prior to the order of the qualifying member, and concerning the same security for which the qualifying member placed the buy order, had been executed subsequent to placement of the qualifying member's buy order and as long as at least 100 (or any other decided upon number, e.g., 1) shares of each of the potential matching sell orders is matched to the party who set the bid (the party who set the initial outstanding bid for the subject security at the subject limit price)). (It is noted that the party who set the bid may also be a qualifying member.)

For example, FIG. 1 shows a log of buy orders set by four parties, including A, the public, and B-D, each of whom is a qualifying member, where orders A-D were received sequentially beginning with order A. The public A may be formed by one or more sub-orders, including the initial order which set the bid. Order A is for 100,000 (100M) shares, order B is for 10,000 (10M) shares, order C is for 10,000 (10M) shares, and order D is for 1,000 (1M) shares. The orders may be queued on a member-by-member basis, such that multiple open orders placed by the same member at different times are aggregated, even where different ones of the multiple orders are placed for different clients of the respective member. (The limit prices are not shown. Further, it is noted that the features described with respect to FIG. 1 may be applied as well to market orders.)

FIG. 1 further shows a series of sequential incoming sell orders 1-5 which meet the price limits, if any, of the buy orders A-D. Sell order 1 is for 200 shares. Assuming this is not the first sell order received after the order D, FIG. 1 shows allocation of 100 shares to order A, 100 shares to order B, and 0 shares to each of orders C and D. (This may be so since the smallest number of shares traded in a single transaction on the securities exchange is 100 shares. However, any other decided upon number, e.g., 1, of shares maybe implemented in the alternative.)

Sell order 2 is for 200 shares, of which 100 shares are allocated to order A (since for each incoming sell order, the first 100 shares are allocated to the party who set the bid, assuming the party's buy order has not yet been fully executed), 100 shares are allocated to order C, and 0 shares are allocated to orders B and D.

Sell order 3 is for 200 shares, of which 100 shares are allocated to order A, 100 shares are allocated to order D, and 0 shares are allocated to orders B and C.

Sell order 4 is for 300 shares, of which 100 shares are allocated to order A (because it belongs to the party who set the bid), 100 shares are allocated to each of orders B and C, and 0 shares are allocated to order D.

Sell order 5 is for 300 shares, of which 100 shares are allocated to each of orders A, B, and D, and 0 shares are allocated to order C.

Thus, as illustrated by FIG. 1, a member or specialist is provided a distinct benefit for skipping over other parties for matching portions of counter-orders on the book via a round-robin allocation. As noted above, the round-robin allocation may be on a member-by-member basis, rather than on an order-by-order basis. The client can take advantage of this benefit by placing an order through the qualifying member.

To place the order, the client transmits an order, e.g., via phone, e-mail, in person, etc., to the member firm, at which the order is manually entered into the member's order management system (OMS). The OMS keeps track of all orders of the member, including information regarding which orders remain open and which have been filled or partially filled. The OMS may also automatically forward the order to the hand-held device of a floor broker of the member. The floor broker then selects a third party e-quote access point, which may be implemented on a server, and forwards the order or a part of the order to the selected third party e-quote access point, which submits the order or parts thereof to the securities exchange point of sale for placement on the book. The securities exchange rules require order placement to follow the described party chain from client to OMS to hand-held to third party e-quote access point and finally to the point of sale. Upon execution of an order, notification of the order's execution is provided back to the OMS via the reverse chain, from the point of sale to the third party e-quote access point to the hand-held and then to the OMS, which may update its records to indicate the order or partial order's execution.

DETAILED DESCRIPTION

The member may follow a particular trading strategy for a client to place different parts of the client's order on the third party e-quote access point server at different times throughout the trading day.

Similarly, often the third party e-quote access point server implements a predefined algorithm for splitting a received order into child orders which can be separately sent to the point of sale, e.g., throughout a trading day. Prior to complete execution of an order, the client may decide to modify instructions with respect to the non-executed parts of the parent order. Such modifications may include, for example, cancellation of part of the order, a change to price limits, and/or required market conditions for execution of portions of the order. The modifications may include different instructions for different parts of the parent order.

A time delay in transmitting modification instructions with respect to a parent order through the chain beginning with the OMS to the point of sale (including manual entry at the hand-held) may cause the client to miss out on certain matching opportunities, as described above, which would have otherwise been available to the client through the qualifying member, where the modification is to execute a child order which would not be executed according to the prior standing instructions. Similarly, for an order whose standing instruction is to be placed on the book, because of the matching preferences afforded the client via the qualifying member, a cancel or hold child order may not be performed in time, prior to execution via the preferred matching.

Moreover, a client presently communicates an overall trading strategy to a member, which the member may follow for transmitting child orders to the third party e-quote access point server. However, the member may handle orders by multiple clients, and the manual entry required for handling of all of the clients' orders creates further delay, which may cause the client to lose out on some of the preferential order matching treatment afforded the qualifying member.

Furthermore, trades executed in accordance with algorithms executed on the third party e-quote access system are not controllable in an efficient manner by the clients and/or OMS.

Figure 1:
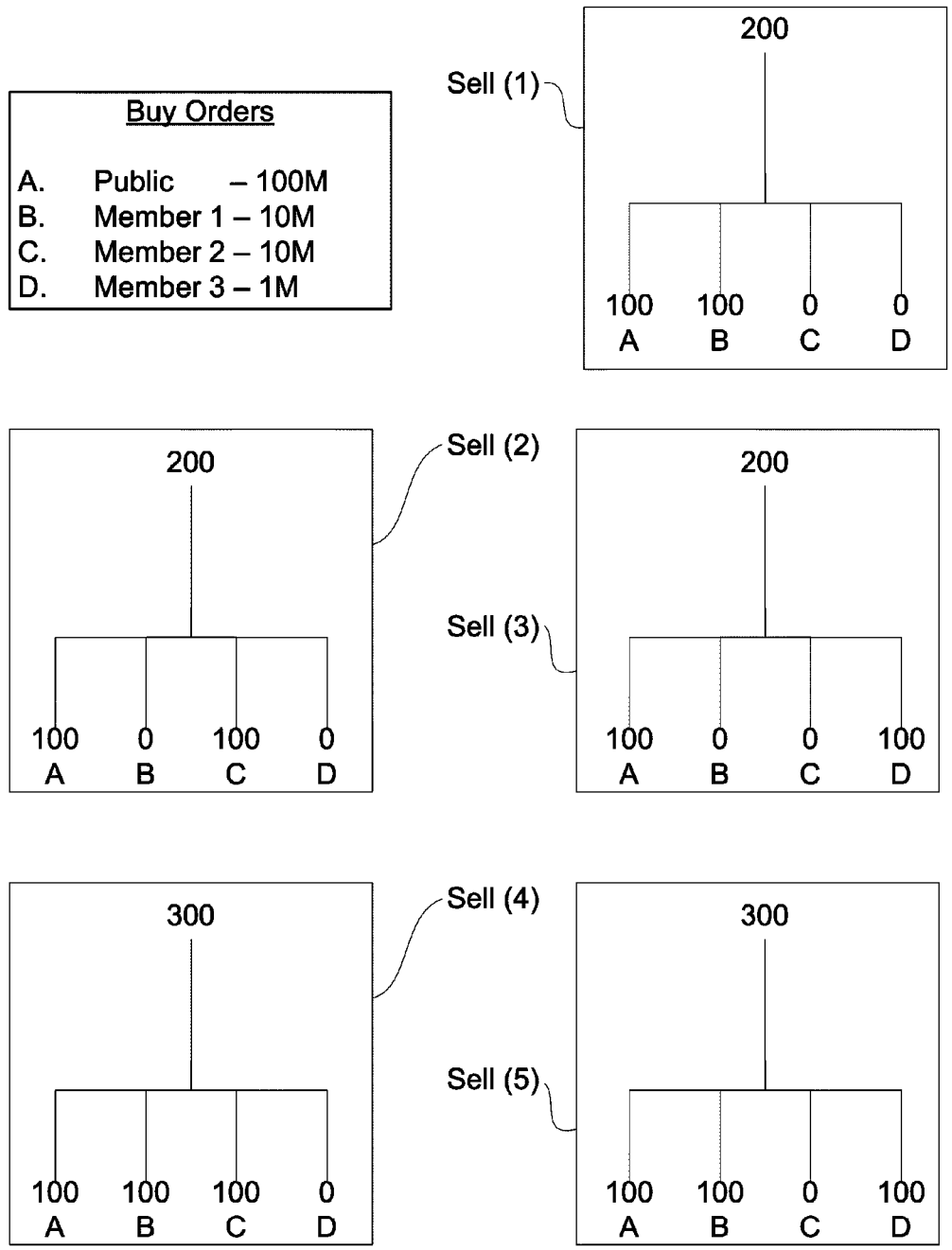
FIG. 1 shows a round-robin allocation of sell orders to buy orders.
Figure 2:
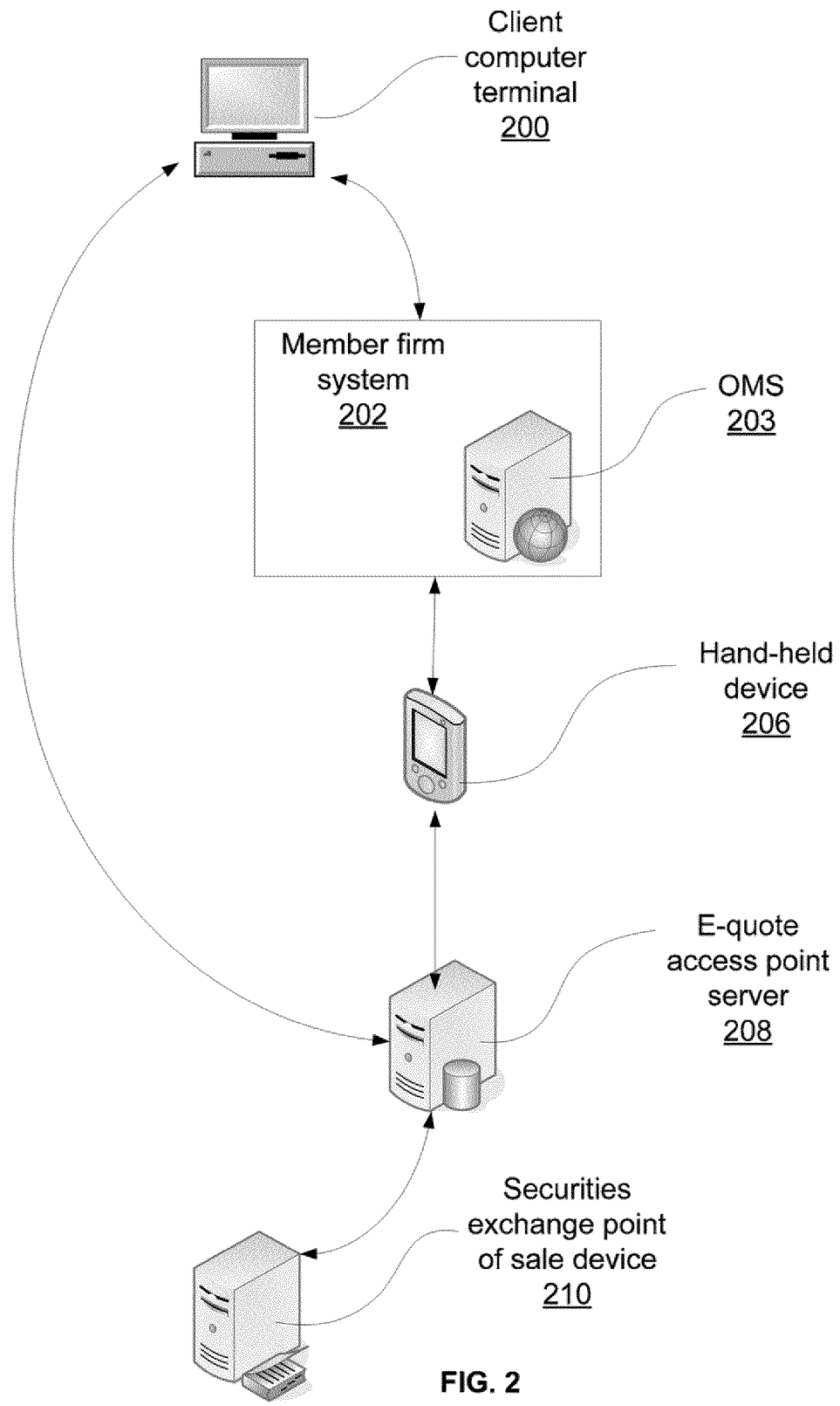
FIG. 2 shows a system and work-flow for managing orders, according to an example embodiment of the present invention.

In an example embodiment of the present invention, a client may place a parent order with a member firm, e.g., via phone to an operator of the member firm system 202 shown in FIG. 2, via e-mail using a client computer terminal 200 and to the operator of the member firm system 202, or in person to the operator of the member firm system 202. The operator may key in the order received from the client (or client computer terminal 200) into an OMS 203 running on the member firm system 202. The OMS 203 may record each entered order in memory according to a predefined order template. The OMS 203 may indicate execution information regarding entered orders. For example, the OMS 203 may be informed of execution of an order or a portion thereof, and may update a record to indicate the execution or partial execution. In response to entry of the order into the OMS 203, the OMS 203 may forward a message, including details of the entered order, to a hand-held device 206 of a floor broker of the member firm. For example, after review of the order received on the broker's hand-held device 206, the broker may determine how to process the order, e.g., in view of outstanding instructions by the client. In an example embodiment of the present invention, such instructions may be indicated along with the order and transmitted by the OMS 203 to the hand-held device 206 for viewing by the floor broker. (The entry device used by the broker need not be a hand-held device, but may instead be any qualifying computing device, including a stationary device.) Based on the determined method of processing, the broker may operate the hand-held device 206 to transmit a portion, e.g., all, of the order to a third party e-quote access point server 208. The e-quote access point server 208 may transmit the received portion of the order or a portion thereof, e.g., according to an algorithm running on the server 208, to a securities exchange point of sale device 210 for placement on the book.

(While the chain shown at the right side of FIG. 2 is as described above, beginning with the client, to the OMS 203, to the hand-held device 206, etc., it will be appreciated that other communication paths may be used in other embodiments, e.g., to comply with any pending exchange implemented rules prevailing at the time the order is submitted. Indeed, according to an example embodiment of the present invention, the system and method may provide generally for submission of a parent order and its child order modifications via different communication paths, for example, as more fully described below.)

After the parent order has been transmitted to the third party e-quote access point server 208 along the chain shown at the right side of FIG. 2 and described above, the client may enter order modifications via the client computer terminal 200 according to a predetermined protocol, e.g., the Financial Information Exchange (FIX) protocol, which may be routed directly to the third party e-quote access point server 208, as shown at the left hand side of FIG. 2. The order modifications may identify the parent order to which it pertains, e.g., by parent order ID or any other information that uniquely identifies the parent order, e.g., a client ID in combination with an identification of the relevant security and/or side (such as buys side or sell side).

For example, a user of the client computer terminal 200 may initiate a FIX session, e.g., in the morning, with the third party e-quote access point server 208, which session may remain open throughout the day for transmission of FIX messages for modifying a parent order placed by the hand-held device 206.

Where a FIX message is sent, FIX tags may provide meaning to certain parameters included in the message, which parameters may be used by the e-quote access point server 208 to determine to which previously received parent order the presently received modification order relates. For example, tags 55 and 54 may be used to identify the symbol and side (e.g., buy, sell, etc.), respectively, and any of tags 1, 57, 58, and 204 may be used to identify a customer. Tag 57 may be especially suitable for this purpose. Where each customer is associated with at most one parent order per combination of symbol and side, symbol, side, and customer number may be sufficient for identification of a parent order. Each customer's identification number may remain fixed indefinitely and a program executed on the client computer terminal 200 for transmitting the FIX messages including the modification orders may either include code for inserting the predetermined customer number or may cause the processor to obtain such information from a memory location.

On the user interface side, the user of the client computer terminal 200 may enter modifications for a certain previously placed parent order, identified in a predetermined manner, e.g., via selection from a displayed list. Upon receipt of the modification requests via the user interface of the client computer terminal 200, the processor may generate the FIX message including the stored customer ID number, the symbol, and the side.

In an alternative example embodiment, each placed parent order may be assigned an ID which is communicated to the client computer terminal 200. For example, the e-quote access point server 208 may transmit a message up the chain of the right path of FIG. 2 or directly to the client computer terminal 200 notifying the client computer terminal 200 of the ID of each placed parent order, which may then be used by the client computer terminal 200 for generating a FIX message with the correct ID.

On the user interface side, the user of the client computer terminal 200 may enter modifications for a certain previously placed parent order, identified in a predetermined manner, e.g., via selection from a displayed list. The processor of the client computer terminal 200, upon receipt of the order ID from the e-quote access point server 208, may internally store the order ID in association with the orders identified on the user interface in the predetermined manner. Upon receipt of the modification requests via the user interface of the client computer terminal 200, the processor may generate the FIX message including the associated order ID obtained from the e-quote access point server 208. Alternatively, the order ID number may be generated further up the chain on the right side of FIG. 2, e.g., at the hand-held device, and may be communicated back to the client computer terminal 200 from, e.g., the hand-held device.

A dedicated GUI may be provided on the client computer terminal 200 for inputting and/or providing an instruction for transmitting the child orders (parent order modifications). In an example embodiment, the client computer terminal 200 may store an application that provides a GUI for entering initial parent orders that are provided to the member firm system 202 and for entering the child orders provided to the e-quote access point server 208.

For example, an electronic form may be selectable for input of order details for a parent order. The client computer terminal 200 may, e.g., in response to a submission instruction, such as that input by selection of a "submit" button, generate an e-mail with the order details and transmit it to the member firm system 202. Alternatively, the client computer terminal 200 may submit an order directly to an order entry and/or management system on the OMS 203.

Different graphical arrangements may be used for entry of child orders than those used for entry of parent orders. For example, the GUI for entry of child orders may include a selectable listing of parent orders. Upon selection of a parent order listing, the processor of the client computer terminal 200 may display a form for entry of child order details in fields of the form. Upon selection of a submit instruction, the processor may cause communication of the child order details as specified by the form, e.g., using the FIX protocol.

The server 208 may automatically modify the order and/or order strategy applied to the parent order according to the received modification instructions. Accordingly, the modification instructions may be handled by the third party e-quote access point server 208 without the described delay associated with a parent order.

The devices shown in FIG. 2 may be communicate, for example, over a virtual private network (VPN), via broadband communication lines, and using the FIX protocol.

In an example embodiment of the present invention, the method and system may additionally provide control to the client for managing orders in a trading day for an initial trading strategy, by placement of a shell parent order, and subsequent placement of modifications as child orders which are actually executed.

Figure 3:
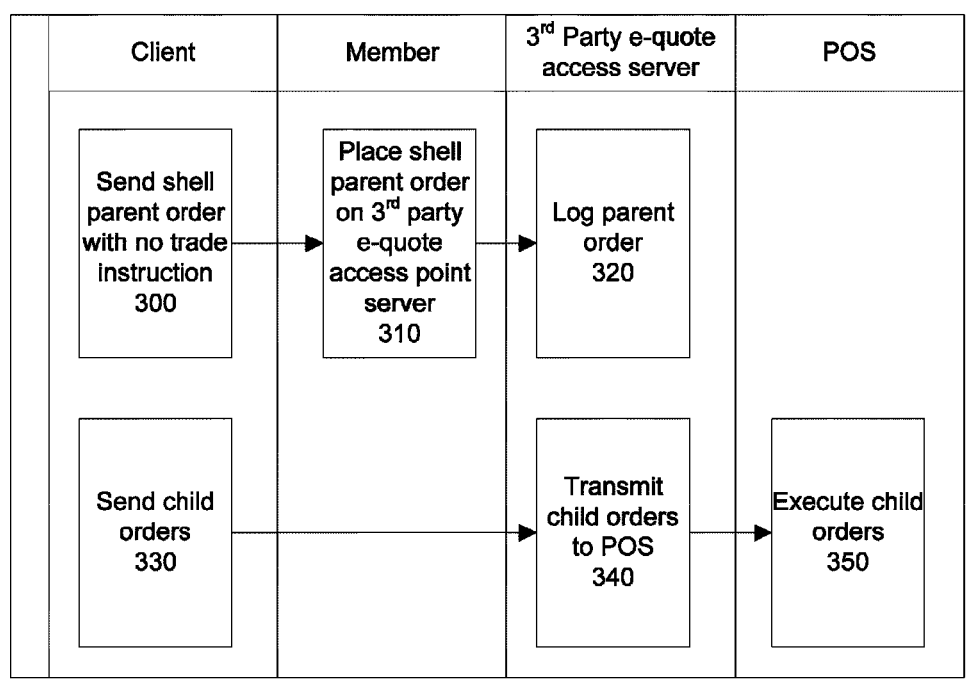
FIG. 3 is a flowchart that illustrates a method for providing client control over order execution even when obtaining member benefits, according to an example embodiment of the present invention.

Accordingly, as shown in FIG. 3, at step 300, a client may send a shell parent order with a no-trade instruction to the member, via any suitably appropriate communication arrangement, e.g., via e-mail, a dedicated communication path set up between the client computer terminal and the member firm system, via telephone, in-person, etc. For example, the order may be very large and may be, e.g., a day order whose unexecuted portion may be canceled at the end of the day. At step 310, the member may enter the shell parent order into its OMS and hand-held, and, via the hand-held to the third party e-quote access point server. (As noted above, the entry device used by the member need not be a hand-held device, but may instead be any qualifying computing device, including a stationary device.)

In an example embodiment, a reference to a shell order trading strategy may be stored in memory on the hand-held (or other) device. The stored reference to the shell order trading strategy may be selectable via a graphical user interface (GUI) displayed on the hand-held device. For entry of the order on the hand-held (or other) device for transmission to the e-quote access point server as a shell order, an order listing corresponding to the order to be entered and that is displayed in a first section of the GUI may be selected. While the order listing is selected, the reference to the shell order trading strategy may be selected from a second section of the GUI. In an example embodiment, the second section may include fields for entry of additional information. For example, the hand-held device may be configured to communicate with a plurality of other devices of one or more other entities, and a field may be provided for input of the entity and/or device to which to transmit the shell order. Upon entry of a submit instruction, the hand-held device may forward the order listing together with an instruction identifying the selected shell order trading strategy to the indicated entity and/or device.

In an example embodiment of the present invention, the shell order may be transmitted by the hand-held device to the third part e-quote access point server using a FIX message in a FIX session. For example, the member may initiate a FIX session between the hand-held device and the third party e-quote access server, e.g., in the morning, which may remain open for the day, during which order pertaining numerous symbols, sides, and customers may be transmitted to the third party e-quote access system. As described above, the shell order may be transmitted with tags and associated fields indicating the customer for which the order is placed, the symbol, and the side. In an example embodiment, for each symbol of an asset the customer indicates for placement of a shell order, the hand-held device may place two shell orders, one for the buy side and one for the sell side. (Alternatively, the hand-held device may place the order without specifying a side, and the third party e-quote access server may automatically convert an order received according to the shell trading strategy into buy and sell orders.)

At step 320, the third party e-quote access point server may log the shell parent order in accordance with the shell order strategy instruction. Because the shell parent order is defined as a no-trade order, the algorithm applied by the third party e-quote access point server to the parent order keeps the order on hold without any transmission of any part of the order to the point of sale. It is noted that the parent order may be made as a partial no trade order, such that an initial part may be executed upon receipt of the order and the remaining portion may be unexecuted according to the no-trade instruction. In this regard, various versions of the shell order strategy may be stored and referenced. Different clients may prefer different ones of the versions of the strategy. Moreover, a client may use different versions for different orders.

At step 330, the client may send, e.g., throughout the day, various child orders as modifications to parts of the shell parent order directly to the third party e-quote access point server, bypassing the member because the modifications are to a parent order for which the chain requirements described above, including the OMS and hand-held, have already been satisfied. The modifications may specify a subset of the number of shares of the parent order which are to be immediately executed, for example. The child orders may be sent, e.g., as FIX messages from the client computer terminal directly to the e-quote access point server. The FIX messages may identify the parent order(s) to which they pertain, as described above, for example, by identifying the customer, symbol, and side.

At step 340, in response to the received child order (modification of the shell parent order), the third party e-quote access point server may transmit the child order to the point of sale, which may execute the child order at step 350 by placing the child order on the book.

Confirmations of any executed child order may be transmitted back up through the chain to the OMS as described above. Alternatively, confirmation may be transmitted from the point of sale to the third party e-quote access point server, which may forward a report of the order execution directly back to the client as a response to the child order instruction transmitted at step 330, or in response to a FIX session set up between the client computer terminal and the third party e-quote access point server for receipt of execution reports. Such a FIX session may be separate from the FIX session used for transmitting the child orders from the client computer terminal to the third party e-quote access system. For example, the user of the client computer terminal may initiate a first FIX session for transmitting the child orders and second FIX session for receiving the execution orders. In an example embodiment, in response to a user instruction entered via the interface of the client computer terminal for transmitting a child order, the client computer terminal may initiate both FIX sessions. Alternatively, the client computer terminal may initiate the FIX session(s) upon receipt of a user instruction for transmitting a shell order request to the member firm system. Alternatively, the client computer terminal may initiate the FIX session(s) automatically at the beginning of a market trading period, e.g., the beginning of a trading day. Alternatively, the client computer terminal may initiate the FIX session(s) responsive to a user request to initiate the FIX session(s). In an example embodiment, execution reports may be sent via both communication paths.

Accordingly, a client may directly instruct the third party e-quote access point server to place a plurality of orders throughout a trading day, as long as the plurality of orders are for the same security as, and for less than or equal to the specified number of shares of, the parent order.

It is noted that a plurality of shell orders may be placed throughout a trading day. Where exchange or other regulatory rules permit only one parent order per client, the system of the present invention may limit the shell orders for any one client to a single open shell order for any given time. While the above has been described with respect to buy orders, the same may be applied to sell orders, where a shell sell order with a hold instruction is placed, and then subsequent child sell orders are placed by the client directly to the third party e-quote access point server. Further, as described above, shell orders for both sides may be outstanding at any one time, and/or, as described above, may be placed in response to a single shell order instruction from the client. While the above has been described with respect to securities transactions, the described embodiments of the system and method of the present invention may be applied to other asset types as well.

In an alternative example embodiment of the present invention, an algorithm running on the hand-held device or member firm system 202 may execute an algorithm to take the place of the client computer terminal for automatically generating child orders and transmitting the automatically generated child orders to the third party e-quote access server 208. For example, a customer may choose for the member to use an algorithm running on a processor of the member firm system 202 to generate FIX messages including instructions for child orders. A FIX session may accordingly be set up between the member firm system 202 and the third party e-quote access system 208 for transmitting child orders, besides for a FIX session between the handheld device 206 and the third party e-quote access system 208 used for transmitting the shell orders to which the child orders pertain.

An example embodiment of the present invention is directed to one or more processors, which may be implemented using any conventional processing circuit and device or combination thereof, e.g., a Central Processing Unit (CPU) of a Personal Computer (PC) or other workstation processor, to execute code provided, e.g., on a hardware computer-readable medium including any conventional memory device, to perform any of the methods described herein, alone or in combination. The one or more processors may be embodied in a server or user terminal or combination thereof. The user terminal may be embodied, for example, a desktop, laptop, hand-held device, Personal Digital Assistant (PDA), television set-top Internet appliance, mobile telephone, smart phone, etc., or as a combination of one or more thereof. The memory device may include any conventional permanent and/or temporary memory circuits or combination thereof, a non-exhaustive list of which includes Random Access Memory (RAM), Read Only Memory (ROM), Compact Disks (CD), Digital Versatile Disk (DVD), and magnetic tape. Such devices may be used by the client for entering parent and/or child orders, by the member for the OMS and hand-held capabilities, and by the third party e-quote access point server for handling received orders.

An example embodiment of the present invention is directed to one or more hardware computer-readable media, e.g., as described above, having stored thereon instructions executable by a processor to perform the methods described herein.

An example embodiment of the present invention is directed to a method, e.g., of a hardware component or machine, of transmitting instructions executable by a processor to perform the methods described herein.

The above description is intended to be illustrative, and not restrictive. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method, comprising:
   storing a predefined algorithm;
   obtaining, by a computer processor of a first device and in a first communication session that is associated with a customer trading representative and that is usable for entering orders for a plurality of customers throughout a trading day, a parent order identifying the predefined algorithm;
   responsive to the parent order, in accordance with the stored predefined algorithm, recording, by the processor, the parent order without placing the parent order for execution;
   obtaining, by the processor and in a second communication session that is exclusively associated with a particular customer, a child order which is a child of the parent order and identifies the parent order for instructing an execution of a first portion of the parent order for the customer;

responsive to the child order, placing, by the processor, the first portion of the parent order for execution;

upon execution of the child order, transmitting, by the processor and to a device in a communication session that is exclusively associated with a particular customer, a report of the execution of the child order;

wherein:
the second communication session is usable for entering only child orders of parent orders previously placed in a customer-trading-representative associated communication session; and in accordance with the stored predefined algorithm, all portions of the parent order that do not correspond to any order that is a child of, and that identifies, the parent order remain unexecuted.

2. The method of claim 1, wherein the parent order is a day order, all portions of which that are unfilled by an end of the trading day being canceled.

3. The method of claim 1, wherein the parent order is obtained directly from second device associated with the customer trading representative and the child order is obtained directly from a third device associated with and controlled by the particular customer for whom the parent and child orders are placed.

4. The method of claim 1, further comprising:
responsive to the obtaining the parent order, in accordance with the stored predefined algorithm, splitting the parent order into a buy parent order for a number of shares and a sell parent order for the number of shares.

5. The method of claim 4, wherein the number of shares is specified in the obtained parent order.

6. The method of claim 1, wherein the child order is one of a plurality of child orders identifying the parent order, different portions of the parent order being placed for execution in response to different ones of the obtained child orders.

7. The method of claim 1, wherein the first communication session is a Financial Information Exchange (FIX) protocol session.

8. The method of claim 7, wherein the second communication session is also a FIX protocol session.

9. The method of claim 8, wherein the FIX protocol session in which the parent order is obtained is between (a) a second device that is of the customer trading representative and (b) the first device, and the FIX protocol session in which the child order is obtained is between (a) a third device that is operated by the particular customer with whom the second communication session is exclusively associated and for whom the child order is placed for execution and (b) the first device.

10. The method of claim 9, wherein the FIX protocol session in which the parent order is obtained is initiated by the second device, and the FIX protocol session in which the child order is obtained is initiated by the third device.

11. The method of claim 10, wherein:
the transmission of the report is to the third device; and
the communication session in which the report is transmitted is a FIX protocol session between the third device and the first device initiated separate from the second communication session.

12. The method of claim 1, further comprising:
responsive to the child order, decrementing, by the processor, an amount of the parent order remaining for placement for execution.

13. The method of claim 1, wherein the second communication session is usable multiple times during the trading day for entering respective ones of the child orders.

14. A computer-implemented method, comprising:
storing a predefined algorithm;
obtaining, by a computer processor of a first device, in a first communication session usable for entering orders for a plurality of customers throughout a trading day, and from a second device associated with and operated by a customer trading representative, a parent order identifying the predefined algorithm;
responsive to the parent order, in accordance with the stored predefined algorithm, recording, by the processor, the parent order without placing the parent order for execution;
obtaining, by the processor, in a second communication session, and from a third device associated with and operated by a customer, a child order which is a child of the parent order and which identifies the parent order for instructing an execution of a first portion of the parent order for the customer;
responsive to the child order, placing, by the processor, the first portion of the parent order for execution;
upon execution of the child order, transmitting, by the processor and to the third device, a report of the execution of the child order;
wherein:
the second communication session is usable for entering only child orders of parent orders previously placed by one or more customer trading representative devices; and
in accordance with the stored predefined algorithm, all portions of the parent order that do not correspond to any order that is a child of, and that identifies, the parent order remain unexecuted.

* * * * *